3,051,563
METHOD OF CORRECTING TRACE METAL DEFICIENCIES IN SOIL BY APPLYING A MIXTURE OF FREE CHELATING AGENT AND IRON CHELATE THERETO
Frederick C. Bersworth, East Orange, N.J., assignor to The Dow Chemical Company, Midland, Mich., a corporation of Delaware
No Drawing. Filed Nov. 20, 1957, Ser. No. 697,515
5 Claims. (Cl. 71—1)

This invention relates to a composition for agricultural use in improving soil in arable land and, in particular, for making available to plants metals which are present in the soil but in their usual condition in the soil are not physiologically available to the plant.

Soil composition as it is encountered in various parts of this or any other country will vary generally from one region to another and will vary specifically with locations within a given region; that is, the soil within a particular region may be characterized by its high alkalinity, lime content, or phosphate content, and thus be suitable for a particular type of agriculture. In a different region of the country the soil may be characterized by acidity and high content of a different metal. For general farming purposes any soil must make available to the plants being grown on it traces of a rather wide variety of metals; some of the metals must be available in more than trace amounts. The most commonly necessary metal for plant physiology is iron, and despite the fact that iron is usually present in soils everywhere in substantial amounts, it is not usually present in a form which is available to the plant. The deficiency of iron results in a condition which is commonly identified as iron chlorosis and tends to produce a physiological condition in the plant wherein other metals become deficient; that is iron deficiency appears to lead to deficiencies of other metals and, similarly, correction of the iron deficiency brings about a new re-balance of the plant physiology which produces a correction in the uptake of other metals.

The conventional method of correcting iron deficiency has been to apply soluble iron salts to the soil. However, the soluble salts are quickly hydrolized to the hydroxide or oxide and rendered thereby unavailable to the plant. It is, accordingly, a fundamental object of this invention to provide a composition of a nature such that the composition itself contains iron in a form directly available to the plant, and, further, it will solubilize and make available to the plant other metals, including iron, which occur in the soil.

It is another object of the invention to provide a composition comprised of chelates and chelating agents such that iron is made available to the plant in the form of a chelate or ion derived from the chelate or the free chelating agent in the composition solubilizes and renders available to the plant iron and other metals in the soil.

It is a further object of the invention to provide a composition which is useful on highly alkaline soils such as those characterized by calcium and calcium phosphate in large amounts.

It is another object of the invention to provide compositions useful for rendering available traces of metals in acid and alkaline soils.

Other objects and advantages of the invention will in part be obvious and in part appear hereinafter.

The composition in accordance with the invention, accordingly, comprises an iron chelate, together with free chelating agent, the chelating agent being identified as a carboxylated amine characterized by the following general formula:

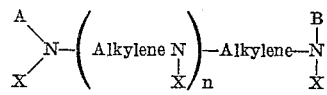

wherein alkylene is a low molecular weight divalent alkyl group which interposes 2–3 carbon atoms between the nitrogen atoms in the chain, such as

—CH$_2$CH$_2$—, —CH(CH$_3$)CH$_2$—, —CH$_2$CH$_2$CH$_2$— and substituted two and three carbon alkylene radicals wherein the substituent may be any radical which does not interfere with the carbon-carbon bridge between the nitrogen atoms, and cyclohexylene; X is one of the group —CH$_2$COOH, —CH$_2$CH$_2$COOH and alkali metal and ammonium salts thereof; A is of the group X, hydrogen, alkyl, alkoxy, aralkyl and sulfhydryl groups and such groups carrying substituents such as carboxyl, ester, hydroxyl wherein the OH group should be on the second or third carbon atoms from the nitrogen, phosphonic, sulfonic acids; and B is of the A and X group and $n$ is 0, 1, 2, 3, 4 or more; the proportions of free chelating agent and iron chelate in the composition being varied from substantially all iron chelate to substantially all free chelating agent, the essential principle being to provide a mixture of the iron chelate in the presence of a chelating agent so that at least a trace of the iron will be available together with at least a trace of the chelating agent. The effect of the application of such a composition to the soil is quickly to set up an equilibrium condition wherein the iron chelate and chelating agent function as a buffering medium and render available to the plant iron ions and ions of other metals present in trace amounts in the soil. The addition of the chelating agent and chelate to the soil may be made directly by application of the pure compound or with a carrier, or they may be added in solution or in the presence of some of the synthetic nutrient or soil conditioning agents, such as polyacrylonitrile soil conditioning agents; that is, they can be applied in powder, liquid or paste form.

Conventional studies of chemical elements in biological systems have been largely restricted to those which occur in high concentrations and can be readily detected, such as carbon, oxygen, hydrogen, nitrogen, calcium, phosphorus, potassium, sulfur, sodium, chlorine, magnesium, iron, and iodine. Other elements found in biological systems have been designated minor elements or trace elements and although about twenty-five such elements have been detected, only a few have to date been indicated to be essential. The others may also be vitally necessary to plants or biological systems, but satisfactory techniques have not yet been worked out for establishing the fact. Of the trace elements which are definitely known to be essential in minerals and land may be mentioned zinc, manganese, molybdenum and cobalt. Other elements found in plants and organisms which probably have essential functions are aluminum, barium, vanadium and boron. In the consideration of plants, iron is generally included among the trace elements and will be treated thus in this application.

The function of trace metals in biological systems has often been compared to that of vitamins. Apparently, they participate in catalytic reactions such as oxygen absorption and transfer, activation of enzyme systems and also react with proteins where they serve as hormones. In the synthesis of vitamin $B_{12}$ cobalt is firmly bound in the chemical structure of the vitamin itself. A variety of so-called "deficiency diseases" have been identified among plants, and in the following tabulation a few typical deficiency diseases have been listed:

TABLE 1

*Trace Metal Deficiency Symptoms*

| Metal | Plant or Animal | Deficiency Symptom |
|---|---|---|
| Boron | Cauliflower | Brown discoloration. |
| | Celery | Cracked stems. |
| | Beet | Black spots on roots. |
| | Radish | Do. |
| | Turnips | Water-soaked areas in flesh. |
| | Apples | Corky areas in flesh. |
| | Alfalfa | Dwarfing and yellowing. |
| | Deciduous trees | Pecan rosette. |
| Manganese | Vegetables and other plants. | Dark green veins and fading o remainder of new leaves, gray speck, phalala blight, speckled yellow, marsh spot. |
| | Fowl and rabbits | Perosis, bone disease. |
| | Pigs | Lameness. |
| Iron | Citrus | Chlorosis-fading of leaves with dark green veins, followed by die-back of branches, etc. |
| | Pineapple | |
| | All animals and man | Anemia. |
| Cobalt | All plants | No pathological symptoms yet described. |
| | Euglena, and | Failure of growth. |
| | Animals | Anemia and emaciation followed by death, disease called Morton Main's disease, bush sickness, enzootic marasmus. |
| Copper | Citrus | Die-back with death of new growth with auxiliary branches below dead limbs, gum pockets between bark and wood, light colored fruit with brown excrescencies. |
| | Tomatoes | Dwarfing, leaves roll inward, and plants become bluishgreen. |
| | Onions | Bulbs lack solidity and are colored pale yellow. |
| | Cattle, goats, and sheep. | Salt-lick, swayback, ootic ataxia. |
| Zinc | Pecan trees | Chlorotic and mottled with rosette buds below dead region. |
| | Cattle | Hyperkeratosis, thickening of the skin, proliferations on the tongue and mouth, lachrymation, and emaciation. |
| | Mice and rats | Impaired growth, ataxia alopecia, anorexia, inanition and death. |
| Molybdenum | Cabbage and cauliflower. | ? |

It cannot be assumed that trace metal requirements of plants or minerals will be satisfied merely by adding a form of the desired metal to the desired nutrient medium. Most deficiencies occur in soils which contain more than adequate quantities of the deficiency metals, but, as indicated, they are in the form of insoluble silicates. Zinc deficiencies are common in soils which have been heavily limed and treated with soluble phosphates which convert the zinc to the insoluble inorganic salts. Iron chlorosis is commonly found in plants growing in soils having a high iron content but a low organic matter. The mechanism usually assumed is that natural organic matter in the soil provides natural complexing agents which solubilize and transport the iron.

An over-supply of a deficient metal can also be harmful. For example, toxicity of copper salts is well known and frequently found in the soil, where frequent applications of copper insecticides have been used to control insect life on the plants. In such situations, it is recognized and identified as copper induced iron chlorosis, for excess copper appears to inhibit the capacity of the plant to take up iron. Molybdenum is commonly present in plants or forage for animals to the extent of 1 to 2 parts per million of the dry feed. However, when its concentration reaches about ten times that level, the animals develop scars, lose weight, develop rough coats and ultimately die. The disease which is known as "teartness" is reversed by administering copper. Thus, an adequate balance between copper and molybdenum in plants seems to be essential for maintaining the health of animals pastured in the areas.

The carboxylated and hydroxyalkylated amines and chelates used in the composition for beneficiating soil according to this invention can be prepared in conventional manner by carboxymethylation of certain low molecular weight amines, for example, ethylenediamine, by reaction therewith of halogenated fatty acids and by condensation of alkali metal, cyanides and aldehydes with the amines. A typical reaction for the conversion of certain diamines to suitable materials in accordance with this invention can be found described in United States Patent 2,407,645, issued September 17, 1946, to Frederick C. Bersworth. Preferred chelating agents and chelates corresponding to the instant invention are those of relatively simple composition and based essentially on ethylenediamine, although those based on polymers of ethylenediamine may be used. The ethylenediamine is the amine from which chelating agents may be derived and is favorable for it provides two carbon spacing between the nitrogen atoms. Three carbons is also desirable for when the diamine having the 2 or 3 carbon spacing is carboxymethylated to form the chelating agent carrying acetic acid functions on the spaced nitrogens, the chelates thereby formed are potentially 5- and 6-membered ring chelates and are characterized by their non-metabolizability. Those favorable chelating agents are ethylenediaminetetraacetic acid, monoethanolethylenediamine triacetic acid, diethanolethylenediaminediacetic acid, diethylenetriamine pentacetic acid, monoethanoldiethylenetriaminetetraacetic acid (i.e., N-hydroxyethyl or N'-hydroxyethyl), diethanoldiethylenetriamine-triacetic acid (i.e., N,N'-dihydroxyethyl or N',N''-dihydroxethyl), and the corresponding compounds based upon propylene, isopropylene, methylethylene and cyclohexylene. When these agents are reacted with an iron compound to form an iron chelate and then made available for soil application or a mixture of the iron chelate with the alkali metal salt of the free acid or the partial salt is applied to soil, there is thus placed in the soil a metal ion and hydrogen ion buffering medium which renders trace metals available to the plants in concentrations useful in the plant physiology.

The composition applied to the soil seems to have at least two functions for it makes iron directly and immediately available to the plant, and phosphates occurring in the soil or in fertilizers applied to the soil are solubilized and the phosphoric acid is liberated for assimilation by the plant. The iron complex is available to the plant as such and advantages is derived from the fact that were the iron not present in complex form it would react with free or freed phosphoric acid, particularly in acid soils, to form ferric phosphates and, thereby, deprive the plant not only of iron but also of phosphoric acid. Iron thus made available to the plant becomes available for the formation of chlorophyll which results in increased vigor of the plants.

Some effort has been made in the past to render phosphoric acid available to plants by the addition of sulfuric acid to the soil, but in this form the iron is only very sparingly available to the plant.

A further advantage of the composition corresponding to the instant invention is that it is characterized by great chemical stability, and will remain in the soil as a chelating agent until leached out, for it appears the chelating agents are not metabolized by the plants nor are they metabolized by soil microorganisms. In addition, they are apparently non-toxic to insects, mammals and appear to have no disadvantageous effect on the useful putrefaction bacteria commonly found in soil.

Experimental evidence of the effect of the chelating agents on the solubilization of phosphates and iron phosphates is indicated by the following example:

One tenth (0.1) mole (29.2) grams of ethylenediaminetetraacetic acid was slurried in 300 milliliters of distilled water. The mixture was heated and stirred and to this was added 0.1 mole (18.7 grams) ferric phosphate while stirring. The slurry started clearing practically immediately. Within five minutes, the reactants had formed a clear olive-brown solution.

A dilute solution of sodium hydroxide was added to the acid chelate thus formed to raise the pH from 1 to 4.5. As the pH was raised, a slight sediment of ferric hydroxide formed. It was removed by filtration. This solubilization of ferric phosphate can also serve as a method for the preparation of the iron chelate of ethylenediaminetetraacetic acid to give a composition containing phosphoric acid useful for direct application to soil. The solid chelate may be isolated from the solution by evaporation to incipient precipitation or by adding an equal amount of alcohol to the concentrated water solution.

Experimentally the application of the composition to a given soil may vary to suit the immediate problem. If it is a strongly alkaline soil; that is, having a pH about 8 or 9, the likelihood is that iron and calcium are unavailable to plants and exist in the soil as the phosphates. Solubilization of these can be achieved through application to the soil of a chleating agent containing one to two ethanol groups, such as the monoethanolethylenediamine triacetic acid or the diethanolethylenediaminediacetic acid. For example, in a citrus grove in Florida where trees were suffering from iron chlorosis, it was found that the application to the grove of the iron chelate of monoethanolethylenediaminetriacetic acid at four levels of concentration, namely 25, 50, 75 and 100 grams of chelated iron per tree at pH 7.4 to 7.9 in the soil, within two months, produced encouraging results where the chelate was applied in amounts of 25 to 50 grams per tree, and very good results where it was applied in amounts of 75 to 100 grams per tree. The tests were judged visually and where a substantial healthy greening of the tree followed as compared with the scaly, chlorotic condition prior to the application, it was called good. It is better in soil applications of the chelating agents to add the material at an amount or level which will be too small a dose rather than too heavy a dose, for it is possible that the very heavy dose can overstimulate growth in the tree and, in the overstimulation, cause ultimate death of the tree. Accordingly, in any application of the chelating agents to soils, where chloroic condition indicates its desirability conservative dosage is dictated.

In a similar test conducted again in Florida in a citrus grove growing in calcareous soil characterized by high calcium content and having a pH of 7 to 8.5, the same iron chelate was applied in amounts at corresponding levels. Within two weeks to a month similar encouraging and good results were observed in that the chlorotic condition of the trees was corrected.

In another series of tests conducted at a subtropical experimental station on ornamental plants of the species Annona, Cordia and Ixora on a calcareous soil the monoethanolethylenediaminetriacetic acid chelate of iron was applied in aqueous solution as a drench at rates of 0.25, 0.5, 1.0. and 2.0 grams per plant. The higher rates of 1 and 2 grams per plant produced substantial greening of the foliage in 7 to 10 days and the lower rates produced similar results, but in a longer period; that is, the greening did not show for a period of 2 to 3 weeks.

The chelates and chelating agents may also be applied by spraying the trees growing in calcareous soils.

The balance between using the ethylenediamine tetraacetic acid and its mono- or diethanol derivatives may be stated approximately thus: Where the soil is neutral or tends to be acid with a pH ranging down toward 6 or 5, it is adequate and sufficient to make iron available to the plant by using the tetraacetic acid derivative, and where the pH of the soil ranges up toward 8 or 9 on the alkaline side, it is preferable to employ monoethanolethylendiaminetriacetic acid or diethanolethylenediaminediacetic acid as the chelating agent or chelating composition. For the highly alkaline soils having pH of 8 or 9 the monoalkylol or dialkylol chelating agent is to be preferred for its efficiency in making iron available to the plant as that pH seems to be about twice that of the tetraacetic acid derivative.

Accordingly, since most soils will have a pH in the range from about 4 to 9 and the largest sampling of soils will generally be in the narrower pH range of 5 to 8, it may be stated, generally, that the preferred composition in accordance with the instant invention is an iron chelate containing at least some of the free chelating agent; the precise percentage can be varied to suit the immediate specific conditions encountered.

A typical product which may be used in accordance with the invention may be formed as follows in accordance with United States Patent 2,407,645:

*Example I*

An appropriate amount, for example, 10 moles of ethylene diamine as a 30 percent aqueous solution and 4 moles of solid caustic soda are placed in a steam heated kettle supplied with an agitator. Eight moles of sodium cyanide as a concentrated water solution (about 30 percent) are added and the solution heated to 60° C. About a 10 inch vacuum is applied to bring the liquid to incipient boiling. Formaldehyde (7.5 moles of 37–40 percent aqueous solution) is slowly added, the temperature being held at 60° C., and the solution vigorously stirred. Then, when the evolution of ammonia has substantially stopped, eight more moles of sodium cyanide, followed by eight moles of formaldehyde are added as before. This is continued until 40 moles of cyanide and forty moles of formaldehyde have been added. Then at the end about 2 moles more of formaldehyde are added, making forty-two in all, to remove any last traces of cyanide. About 8 to 10 hours are required to complete the reaction. The resulting product, referred to herein as the crude reaction product is essentially an aqueous solution of the sodium salt of ethylene diamine tetraacetic acid.

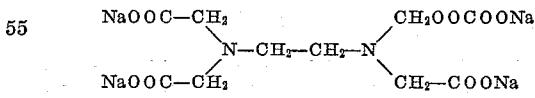

together with various by-products. On acidifying to a pH between 0.75 and 2, the corresponding free acid precipitates, and has been identified by ultimate analysis and electrometric titration curves.

*Example II*

Using the procedure of Example I, but with the following total quantities, a still better yield was obtained:

|  | Pounds |
|---|---|
| Ethylene diamine (70 percent) | 30 |
| NcOH (anhydrous) in 16 lbs. H₂O | 8 |
| Formalin (37 percent) | 137 |
| NaCN (96 percent) in 240 lbs. H₂O | 80 |

When the reaction was completed, 500 lbs. of solution obtained which, when acidified with HCl (about 165 lbs.

of 38 percent HCl to a pH of about 1.5), produced a yield of 81.6 percent of theoretical of

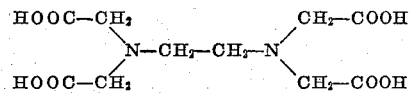

based upon the weight of ethylene diamine used.

Following the preparation of the chelating agent, which may correspond to any of those coming within the scope of the generic formula, the composition comprising the chelating agent and the chelate may be made directly from the reaction mixture obtained in the carboxy methylation. That is, the reaction goes principally in the direction indicated to form the acetic acid derivatives of the diamine used. However, a test of the chelating capacity of the reaction mixture indicates that it has a chelating capacity for metals usually about 10 percent greater than the theoretical capacity it should have, based upon the yield of the acetic acid derivatives. The explanation of this resides in the fact that the reaction produces polyamines and various related amino acids which are not measured as part of the yield of ethylenediaminetetraacetic acid, but appear as chelating agents when the chelating capacity of the reaction product is measured. For preparing compositions having agricultural activity, the entire reaction mixture can be utilized. Thus, following the procedure given for measuring the solubilizing effect of ethylenediaminetetraacetic acid on ferric phosphate, an appropriate amount of ferric hydroxide, carbonate, or basic carbonate can be added to the reaction mixture obtained according to either Example 1 or 2, which has been acidified to a pH below about 7, but not sufficient to precipitate the ethylenediaminetetraacetic acid. The ferric compound is readily dissolved in that mixture to the capacity of that mixture to chelate iron. The amount of iron chelate in the mixture may vary from a small proportion of the capacity of the mixture to take up iron to essential saturation of its capacity to hold iron, but generally it will be found preferable to leave an excess of chelating agent in the iron chelate. The product is then isolated for agricultural applications, is stable over long periods of time.

Accordingly, when a specific application or problem involving treatment of soil in a given location arises, it will be safe to apply to the soil without any information concerning the nature of the soil, a composition in accordance with the instant invention, containing a liberal amount of the chelating agent. If detailed information on deficiency conditions in the soil is available together with pH information, the nature of the composition applied can be optimally adjusted to develop pH control, while at the same time making available trace metals in the soil and the iron in the chelating agent itself. The details and precise conditions for developing pH control can be obtained by following the principles set forth in my copending application.

As basic guides for applying a composition to the soil, it may be stated that where the soil is acid in its pH level, it is preferable to use as the fundamental chelating agent in the composition ethylenediaminetetraacetic acid. This is because this agent is effective to keep iron in chelate form on the acid side. Where the pH level of the soil ranges on the alkaline side, it will be found preferable to utilize ethanol derivatives of ethylenediamine acetic compounds, preferably the monoethanol and diethanol compounds.

Experimental tests indicate therefore that the composition be applied to the soil in amounts preferably less than may be needed to bring about full correction of the needs of the soil, for the activity of the agent in the soil can be such as to over-stimulate the plants. Usually a dosage, where trees are being treated, may be stated in terms of a certain number of grams of chelated iron for trees of a given size, and where simultaneous pH control is being sought, the composition added to the soil may contain 100 percent excess or more of the free chelating agent in the form of any of its alkali metal or ammonium salts. Where the ammonium salts are used, the chelating agent also becomes a source of available nitrogen. Generally, therefore, the composition most useful for correcting metal deficiency in the soil and, at the same time, bringing about some correction of pH conditions is one containing about equal parts of iron chelate and a chelating agent. The free chelating agent need not be the same as the one which supplies the iron. For example, it would be more efficient in soil at an approximate neutral pH to utilize a composition containing iron chelated with ethylenediaminetetraacetic acid and monoethanolethylenediamine triacetic acid. A broad range through which the composition may be varied as to amount of chelating agent and chelate is from about 5 percent of iron chelate, which would be a low level in that the amount of iron thereby added is small, to a composition comprising essentially an iron chelate with about 5 percent of the free chelating agent.

As pointed out above, the fundamental principles of the utilization and balancing of the composition are best understood when referred to the ferric composition as a base. However, in the synthesis of these chelating agents, like any organic synthesis, the reactions do not go quantitatively in the direction indicated and usually will produce related compounds of similar nature which are effective for chelation purposes. Accordingly, when the chelating agent is prepared from formaldehyde and sodium cyanide by the carboxymethylation reaction described, the complete reaction product may be used in forming the iron chelate for use in accordance with the principles herein described. The preferred compounds for use in forming a composition containing a chelating agent and an iron chelate are ethylenediaminetetraacetic acid, monoethanolethylenediamine triacetic acid, diethanol ethylenediamine diacetic acid, diethylenetriaminepentacetic acid, monoethanoldiethylenetriaminetetraacetic acid (i.e., N-hydroxyethyl or N'-hydroxyethyl), diethanoldiethylenetriamine-triacetic acid (i.e., N,N'-dihydroxyethyl or N',N''-dihydroxyethyl) and any and all mixtures thereof.

Having described the invention with reference to certain specific examples and to the fundamental principles controlling its application, it is to be understood that variations thereof may be practiced without departing from the spirit and scope of the invention.

In copending application Serial No. 389,144, filed October 29, 1953, and now abandoned, there are described techniques and compositions for achieving control of trace metals in soil.

What is claimed is:

1. The method of correcting trace metal deficiencies in soil which comprises applying to the soil to be treated an agricultural chelating composition comprising a mixture of free chelating agent and an iron chelate thereof wherein said chelating agent corresponds to the following:

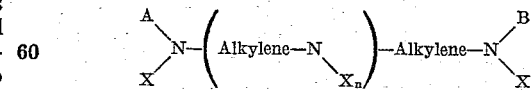

wherein alkylene is a low molecular weight divalent alkyl group which interposes 2–3 carbon atoms between the indicated nitrogens; X is selected from the group consisting of —CH$_2$COOH, —CH$_2$CH$_2$COOH and alkali metal, and ammonium salts thereof; A is selected from the group consisting of X, hydrogen, alkylol, alkyl, aralkyl and sulfhydryl; and B is selected from the group consisting of A and X; and $n$ is an integer from the group 0–4, wherein the relative amounts are at least 0.5% of free chelating agent to about 95% of free chelating agent.

2. The method in accordance with claim 1, in which the chelating agent is ethylenediaminetetraacetic acid.

3. The method in accordance with claim 1, in which the chelating agent is monoethanolethylenediaminetriacetic acid.

4. The method in accordance with claim 1, in which the chelating agent is diethanolethylenediaminediacetic acid.

5. The method in accordance with claim 1, in which the chelating agent is a mixture of diethanolethylenediamineacetic acid and monoethanolethylenediaminetriacetic acid.

References Cited in the file of this patent

UNITED STATES PATENTS

| | | |
|---|---|---|
| 2,407,645 | Bersworth | Sept. 17, 1946 |
| 2,673,213 | Bersworth | Mar. 23, 1954 |
| 2,673,214 | Bersworth | Mar. 23, 1954 |
| 2,808,435 | Young | Oct. 1, 1957 |
| 2,828,182 | Cheronis | Mar. 25, 1958 |
| 2,833,640 | Bersworth | May 6, 1958 |
| 2,859,104 | Kroll et al. | Nov. 4, 1958 |

OTHER REFERENCES

Britzinger et al.: Zeitschrift für Anorganische Chemie, vol. 251, pages 285–295 (1943).

Chaberek et al.: Science, vol. 118, page 280, September 4, 1953 (received April 27, 1953).

Plant Physiology, vol. 26, No. 2, April 1951, "Maintenance . . . Ethylenediamine Tetra-Acetate," by Louis Jacobson, pages 411–413.

Citrus Magazine, vol. 14, No. 10, June 1852, pages 22–25, "Iron Chlorosis Its . . . Control," by I. Stewart et al.